(12) United States Patent
Wu

(10) Patent No.: US 9,027,513 B2
(45) Date of Patent: May 12, 2015

(54) GREEN-LIGHT DEVICE FOR DRIVING MICE AWAY

(71) Applicant: Chih-Hsien Wu, Taipei (TW)

(72) Inventor: Chih-Hsien Wu, Taipei (TW)

( * ) Notice: Subject to any disclaimer, the term of this patent is extended or adjusted under 35 U.S.C. 154(b) by 294 days.

(21) Appl. No.: 13/802,836

(22) Filed: Mar. 14, 2013

(65) Prior Publication Data

US 2014/0245969 A1 Sep. 4, 2014

(30) Foreign Application Priority Data

Mar. 1, 2013 (TW) .............................. 102203875 U

(51) Int. Cl.
*A01K 29/00* (2006.01)
*B06B 1/02* (2006.01)
*A01M 29/00* (2011.01)
*A01M 29/10* (2011.01)
*A01M 29/18* (2011.01)

(52) U.S. Cl.
CPC ............... *A01M 29/00* (2013.01); *A01M 29/10* (2013.01); *A01M 29/18* (2013.01); *B06B 2201/75* (2013.01)

(58) Field of Classification Search
CPC ..... A01M 29/18; A01M 29/10; A01M 29/16; A01K 27/009; A01K 15/02; A01K 29/00; B06B 2201/75
USPC .................... 119/712, 719; 340/573.2, 384.2; 367/139
See application file for complete search history.

(56) References Cited

U.S. PATENT DOCUMENTS

| | | | | |
|---|---|---|---|---|
| 3,873,960 A | * | 3/1975 | Gates, Sr. ...................... | 367/139 |
| 3,879,702 A | * | 4/1975 | Mancone ...................... | 367/139 |
| 4,658,386 A | * | 4/1987 | Morris .......................... | 367/139 |
| 4,669,424 A | * | 6/1987 | Bianco et al. ................. | 119/650 |
| 4,999,818 A | * | 3/1991 | Malleolo ....................... | 367/139 |
| 6,016,100 A | * | 1/2000 | Boyd et al. .................. | 340/384.2 |
| 6,249,417 B1 | * | 6/2001 | Pippen .......................... | 361/139 |
| 6,519,206 B1 | * | 2/2003 | Martin et al. ................. | 367/139 |
| 6,710,705 B1 | * | 3/2004 | Smith et al. ................. | 340/384.2 |
| 6,996,029 B1 | * | 2/2006 | Boyd et al. .................... | 367/139 |
| 7,012,506 B2 | * | 3/2006 | Rich et al. ................... | 340/384.2 |
| 7,506,989 B2 | * | 3/2009 | Tomassetti et al. ............ | 362/86 |
| 7,537,358 B2 | * | 5/2009 | De Ginto et al. ............. | 362/276 |
| 7,598,879 B2 | * | 10/2009 | Weiser et al. ............... | 340/573.2 |
| 7,841,291 B1 | * | 11/2010 | Milanovich ............... | 116/137 A |
| 7,948,386 B2 | * | 5/2011 | Weiser et al. ............... | 340/573.2 |
| 8,243,552 B2 | * | 8/2012 | Amendola et al. ............ | 367/139 |
| 8,737,170 B2 | * | 5/2014 | Kasper .......................... | 367/139 |
| 2008/0314334 A1 | * | 12/2008 | Dalton .......................... | 119/719 |

* cited by examiner

*Primary Examiner* — Yvonne Abbott-Lewis
(74) *Attorney, Agent, or Firm* — Leong C. Lei

(57) ABSTRACT

A green-light device for driving mice away includes a casing and a control circuit in the casing, wherein the control circuit comprises a power conversion circuit, a voltage regulating integrated circuit (IC), an amplifying circuit, a control knob, an ultrasonic frequency oscillator circuit, a logical-determination circuit and multiple green-light emitting diodes (LED) coupled to and controlled by the logical-determination circuit. The control knob is configured to be switched to lead the control circuit to create an ultrasonic wave or a special light wave such that mice can be cheated or driven away.

4 Claims, 4 Drawing Sheets though the traditional technology and product employing a general single-frequency ultrasonic transducer is able to produce a strong sound pressure and only output a pattern of a sound wave with a single frequency, the effect on driving mice away is reduced because the mice get used to the device having been used for a certain period of time. According to scientific studies, mice are nocturnal harmful animal mainly relying on hearing and smelling for chaotic foods or actions, and compared to the sense of hearing and smelling, mice have relatively bad sense of sight, which only detects specific wavelengths of light to determine whether to go out for action. No device is developed in this way for driving mice away and thus the technology can be improved.

GREEN-LIGHT DEVICE FOR DRIVING MICE AWAY

BACKGROUND OF THE DISCLOSURE a) Field of the Disclosure

The invention relates to a technology field of driving mice away, and more particularly, to a green-light device for driving mice away, wherein the device can emit light with specific wavelengths to interfere with visions of mice such that the mice cannot forage and thus can be driven away. The device is adaptively used in kitchen, homes, factories, offices and so on.

b) Brief Description of the Related Art

Mice are harmful animals that can destroy the furniture or crops, steal food and spread diseases. A variety of traps and rat poisoning agents are used to remove the harmful animals, while a device is designed for driving mice away.

With regards to the device for driving mice away, the device traditionally utilizing an oscillator circuit to produce ultrasonic frequencies is put at a specific place. The traditional device drives mice away by an acoustic wave that causes mice feel discomfort. However, even though the traditional technology and product employing a general single-frequency ultrasonic transducer is able to produce a strong sound pressure and only output a pattern of a sound wave with a single frequency, the effect on driving mice away is reduced because the mice get used to the device having been used for a certain period of time. According to scientific studies, mice are nocturnal harmful animal mainly relying on hearing and smelling for chaotic foods or actions, and compared to the sense of hearing and smelling, mice have relatively bad sense of sight, which only detects specific wavelengths of light to determine whether to go out for action. No device is developed in this way for driving mice away and thus the technology can be improved.

Accordingly, for customer advantages, the inventor is devoted to a green-light device for driving mice away, wherein the device can emit light with specific wavelengths to interfere with visions of mice such that the mice cannot forage and thus can be driven away. This is the purpose of the invention.

SUMMARY OF THE DISCLOSURE

An objective of the invention is to provide a green-light device for driving mice away, wherein the device can emit light with specific wavelengths to interfere with mice's determination of day or night such that the mice cannot forage and thus can be driven away.

In order to achieve the above objective, a green-light device for driving mice away is provided including a casing and a control circuit in the casing, wherein the control circuit comprises a power conversion circuit, a voltage regulating integrated circuit (IC), an amplifying circuit, a control knob, an ultrasonic frequency oscillator circuit, a logical-determination circuit and multiple green-light emitting diodes (LED) coupled to and controlled by the logical-determination circuit. The control knob is configured to be switched to lead the control circuit to create an ultrasonic wave or a special light wave such that mice can be cheated or driven away.

In accordance with an embodiment, the power conversion circuit comprises a bridge rectifier composed of multiple diodes.

In accordance with an embodiment, the amplifying circuit is a Darlington amplifying circuit.

In accordance with an embodiment, the green-light emitting diodes are diodes emitting light with specific wavelengths.

Accordingly, the green-light device for driving mice away has the following advantages:

1. When plugged into a socket, the device can be used without any wiring work.
2. The device employs a physic way to drive mice away without any harm of drugs and any chemical. Thus, second environmental pollution is not caused. Safe and hygiene environment can be improved.
3. In accordance with pest control, ultrasonic waves and light waves created by the device are in the safe range and have no impact on the health of humans and animals. Thus, the device can be used for a long time and is effective to drive mice away.

The accompanying drawings are included to provide a further understanding of the invention, and are incorporated as a part of this specification. The drawings illustrate embodiments of the invention and, together with the description, serve to explain the principles of the invention.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

Figure 1:
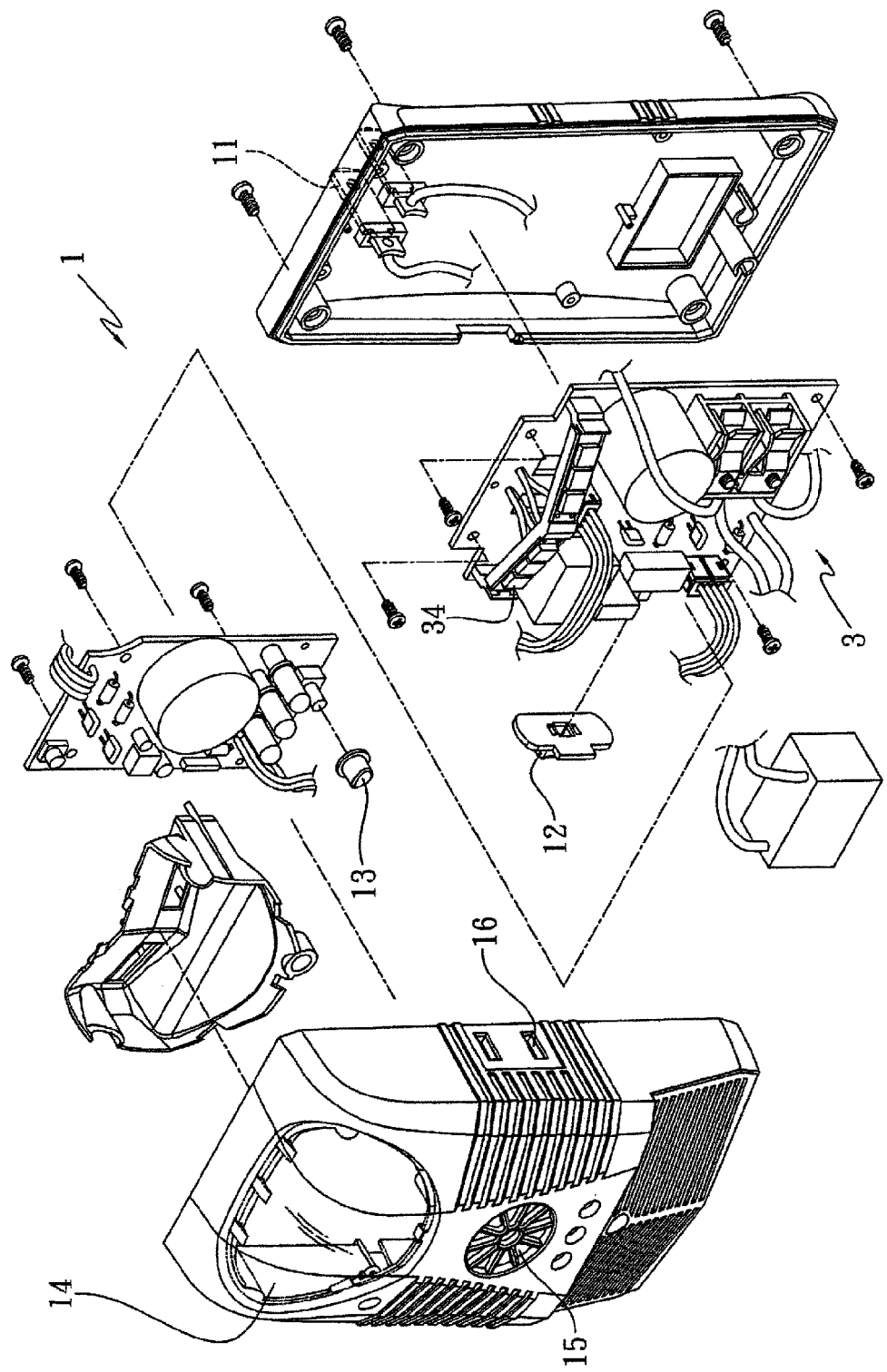
FIG. 1 is an exploded view of elements in accordance with an embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Figure 2A:
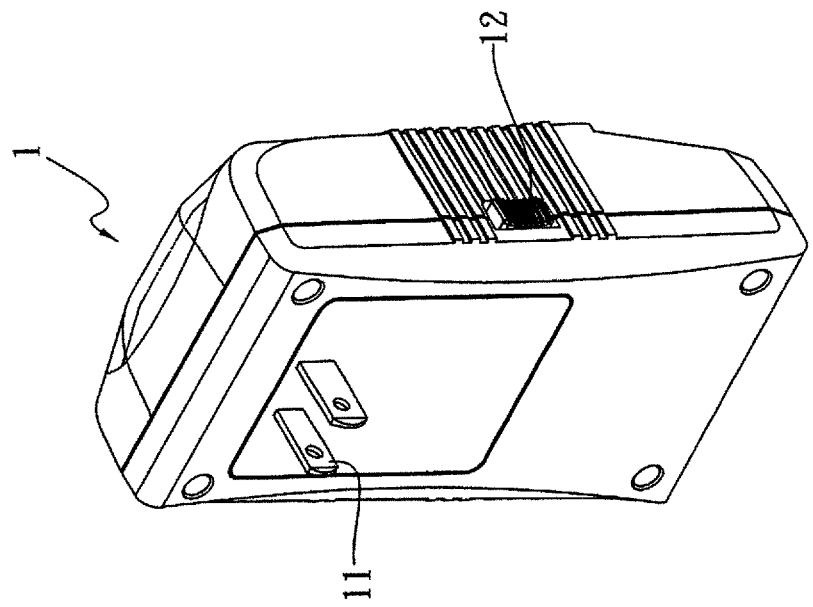
FIG. 2a is a perspective view in another direction in accordance with an embodiment of the present invention.
Figure 2:
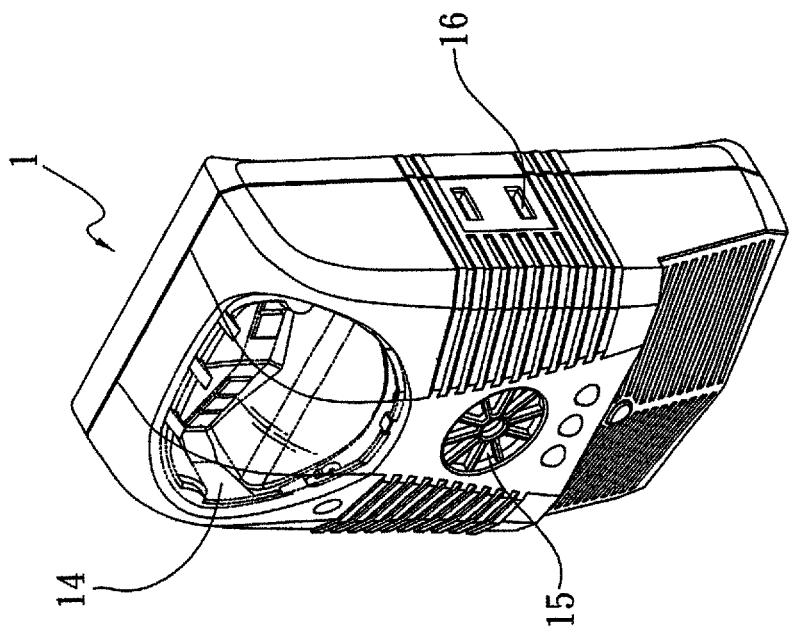
FIG. 2 is a perspective view in accordance with an embodiment of the present invention.

Referring to FIGS. 1, 2 and 2a, in accordance with the present invention, a green-light device 1 for driving mice away includes a casing a power plug 11 is at a backside of the casing, a switch 12 and power socket 16 are at left and right sides of the casing, a control knob 13, transparent window 14 and speaker hole 15 are at a front surface of the casing, and a control circuit 3 including a power conversion circuit 31 is in the casing.

Figure 3:
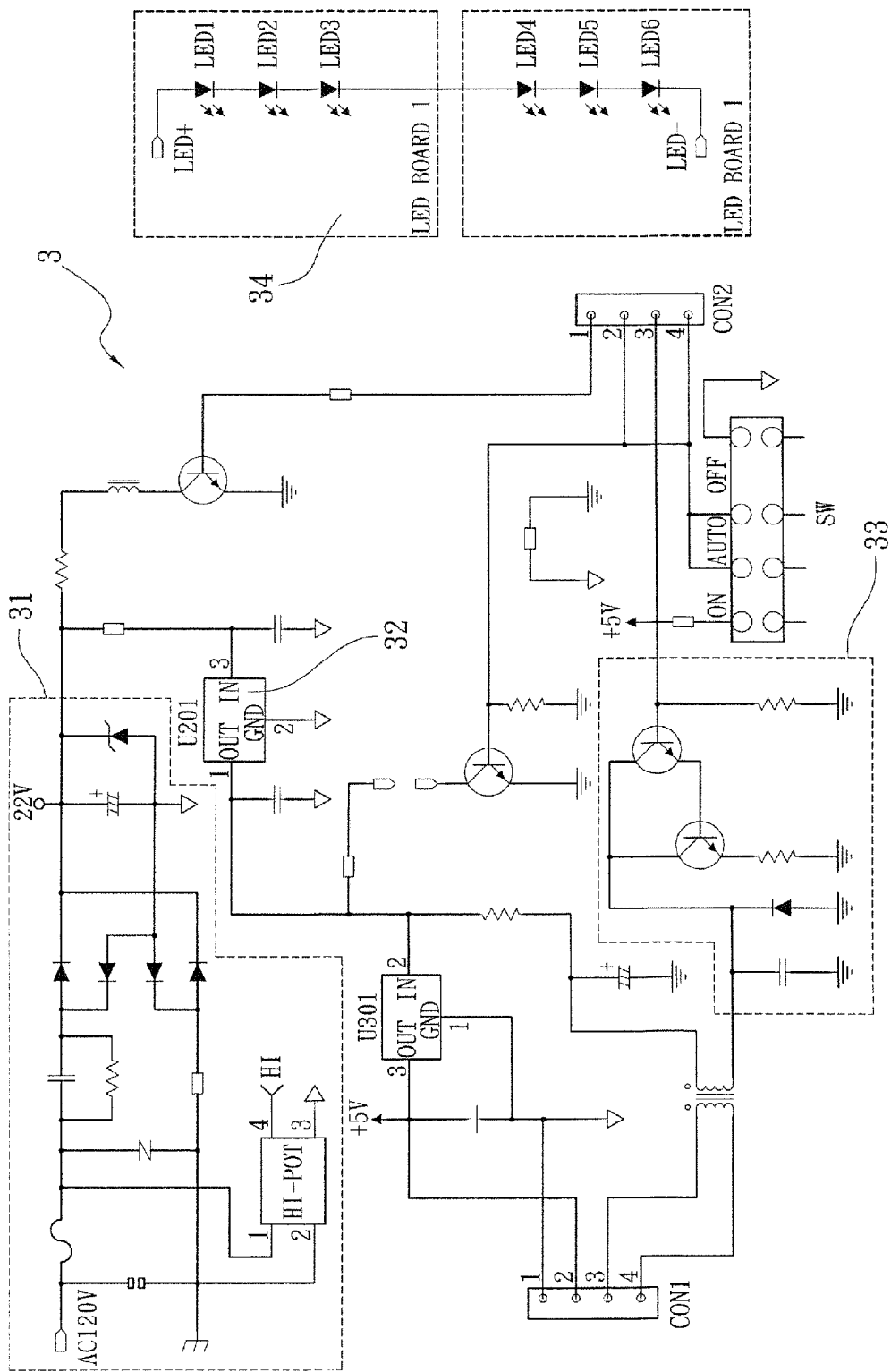
FIGS. 3 and 4 are circuit diagrams in accordance with an embodiment of the present invention.
Figure 4:
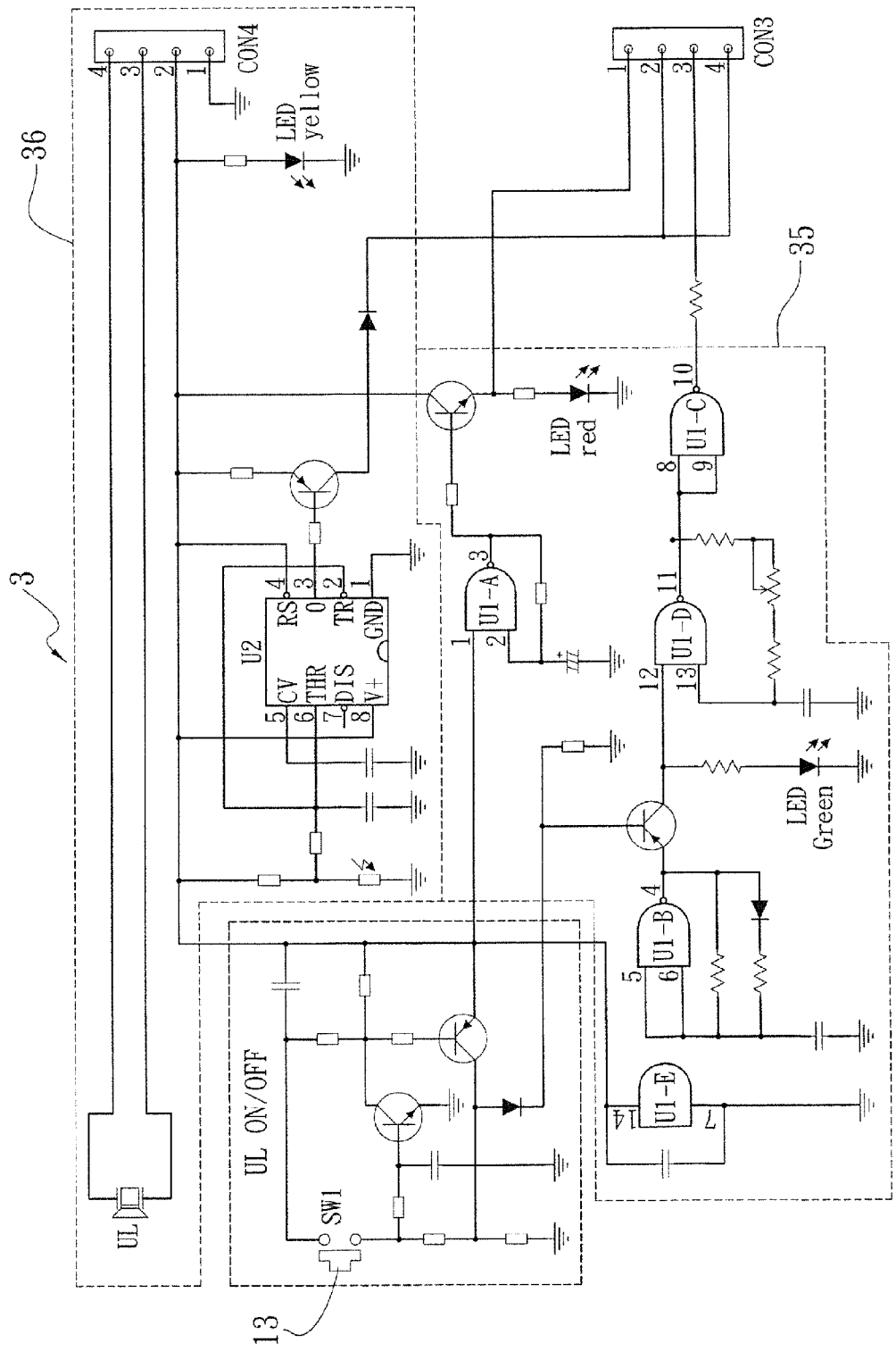

Referring to FIGS. 3 and 4, the power conversion circuit 31 comprises a voltage regulating integrated circuit (IC) 32, an amplifying circuit 33, multiple green-light emitting diodes (LED) 34, a control knob 13, an ultrasonic frequency oscillator circuit 36 and a logical-determination circuit 35.

The power conversion circuit 31 is mainly a bridge rectifier, composed of four diodes, which can convert an alternate current into a direct current. Next, the converted direct current can be regulated by the voltage regulating integrated circuit (IC) 32 and then be amplified by the amplifying circuit 33 so as to be utilized by the green-light emitting diodes (LED) 34. In this embodiment, the amplifying circuit 33 can be a Darlington amplifying circuit composed of two transistors, two resistors, a diode and a capacitor. The green-light emitting diodes 34 are diodes capable of emitting light with specific wavelengths and are controlled by the logical-determination circuit 35 to be automatically turned on or off or to have been turned on for a long period of time.

Besides, the control circuit 3 may further include a negative-ion purifier switched by the control knob 13 to operate for different functions. By means of the ultrasonic frequency oscillator circuit 36 producing high-power ultrasonic waves that reflect back and forth in the indoor air or of the green-light emitting diodes (LED) 34 emitting light with specific wavelengths, mice can be prevented from moving nearby. The device is used not only to drive mice away but to serve as a small night lamp for illumination. Besides, the negative-ion purifier can create negative ions to purify the air and to clean the air from foods or other odors and thus the probability of enticing mice to come nearby can be reduced.

Besides, when the green-light device 1 for driving mice away is plugged into a socket, another electric appliance can be plugged into the power socket 16 on the casing. Thereby, other electric appliances can also be used and thus practicality for supplying power is good.

Accordingly, in accordance with the present invention, the green-light device for driving mice away includes the green-light emitting diodes emitting light with specific wavelengths to interfere with mice's determination of day or night such that the mice cannot forage and thus can be driven away.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A green-light device for driving mice away comprising a casing and a control circuit in the casing, characterized in that:
   the control circuit comprises a power conversion circuit, a voltage regulating integrated circuit (IC), an amplifying circuit, a control knob, an ultrasonic frequency oscillator circuit, a logical-determination circuit and multiple green-light emitting diodes (LED) coupled to and controlled by the logical-determination circuit, wherein the control knob is configured to be switched to lead the control circuit to create an ultrasonic wave or a special light wave such that mice can be cheated or driven away.

2. The device of claim 1, wherein the power conversion circuit comprises a bridge rectifier composed of multiple diodes.

3. The device of claim 1, wherein the amplifying circuit comprises a Darlington amplifying circuit.

4. The device of claim 1, wherein the green-light emitting diodes comprise diodes emitting light with a specific wavelength.

* * * * *